United States Patent [19]
Johnson

[11] 3,764,816
[45] Oct. 9, 1973

[54] VEHICLE LIGHT-IGNITION SWITCHING ARRANGEMENT

[76] Inventor: Robert I. Johnson, 5317 E. Florence Ave., Bell, Calif.

[22] Filed: June 26, 1972

[21] Appl. No.: 266,297

[52] U.S. Cl. .............................. 307/10 LS, 315/80
[51] Int. Cl. ............................................. B60q 1/26
[58] Field of Search .............................. 315/80, 82; 307/10 LS

[56] References Cited
UNITED STATES PATENTS
2,449,338  9/1948  Summersett ........................ 315/80
2,862,148  11/1958  Weigl et al ........................... 315/80

Primary Examiner—L. T. Hix
Attorney—Herbert A. Huebner et al.

[57] ABSTRACT

A motor vehicle electrical system having a light switch with off and on positions includes a solenoid associated with the light switch. The solenoid is connected to a start contact of an ignition switch to be energized when the vehicle is started and the solenoid is operable when energized to actuate the light switch to its off position. The ignition switch is arranged to break the circuit between the light switch and the battery of the vehicle when the ignition switch is switched to its start position.

6 Claims, 1 Drawing Figure

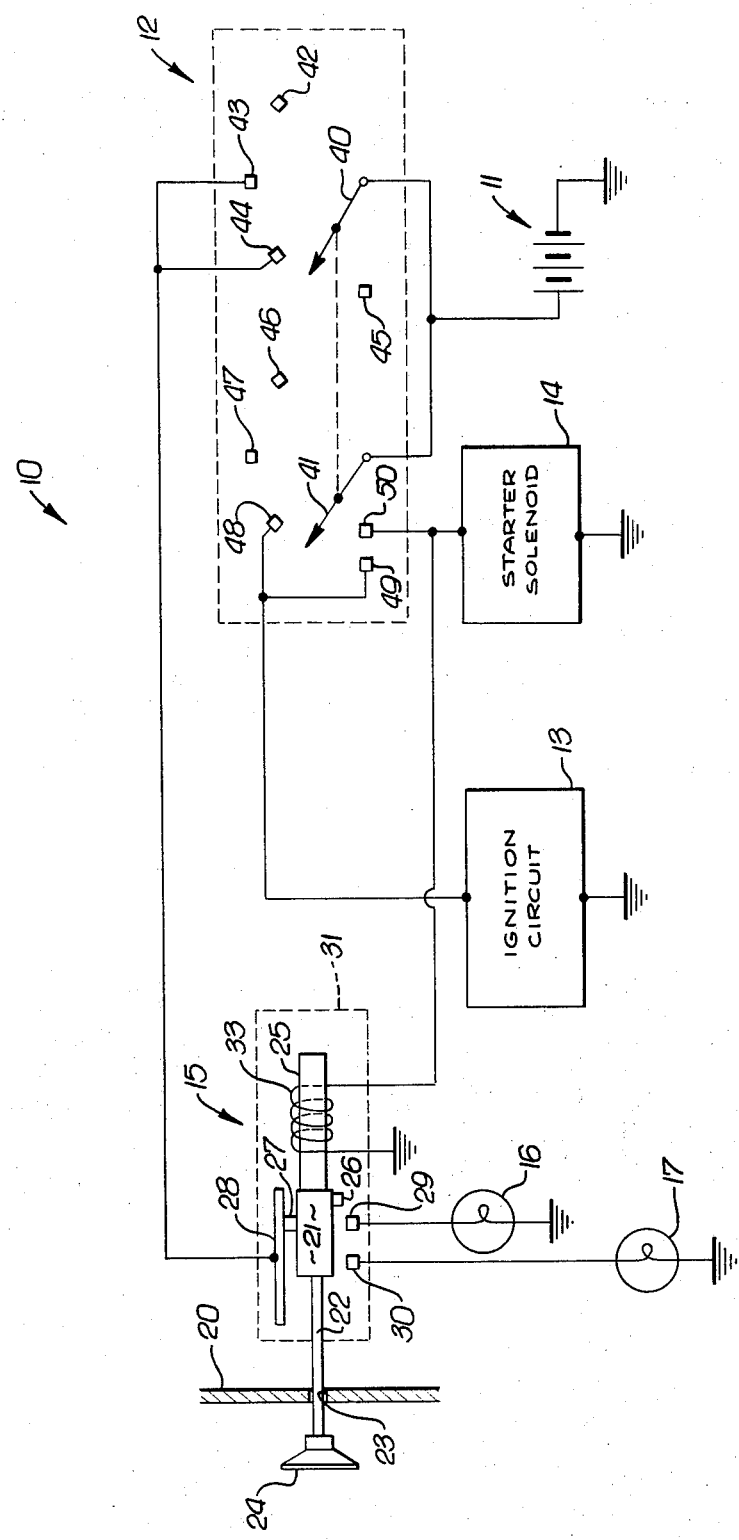

VEHICLE LIGHT-IGNITION SWITCHING ARRANGEMENT

BACKGROUND OF THE INVENTION

The present invention relates to vehicle electrical systems and more particularly to an improved light-ignition switching arrangement for automobiles and the like.

For several reasons, it is desirable that the lights of an automobile be off at the time the automobile is started and that its light switch also be positioned in the off position. One reason is to conserve battery power and protect the battery against excessive current drains at the time of starting the automobile. Another reason is to prevent a driver from inadvertently driving off with the automobile lights illuminated when they are not needed or desired, for example, in the morning when the automobile was parked the night before with its light switch left in an on position.

SUMMARY OF THE INVENTION

It is, accordingly, an object of the present invention to provide an improved light-ignition switching arrangement for vehicles characterized by being operable to automatically position a vehicle light switch in its off position when the vehicle is started.

It is further an object of the present invention to provide an improved light-ignition switching arrangement as set forth which is also operable to electrically disconnect the light switch from the vehicle's battery whenever the ignition switch is switched to its start position.

It is additionally an object of the present invention to provide an improved light-ignition switching arrangement for automobiles and the like which includes solenoid mechanism for selectively actuating the automobile's light switch to its off position.

In accomplishing these and other objects, there is provided in accordance with the present invention an electrical system for a motor vehicle including a light switch having on and off positions. The light switch is connected through an ignition switch to the vehicle's battery. A solenoid is associated with the light switch which is operable when energized to actuate the light switch to its off position. The solenoid is connected to a start contact of the ignition switch so that the solenoid is energized and the light switch actuated to its off position when the vehicle is started. The ignition switch is also arranged to break the electrical circuit between the light switch and the battery when the ignition switch is switched to its start position thereby to prevent momentary illumination of the vehicle lights during starting.

Additional objects of the present invention reside in the specific arrangement of the exemplary motor vehicle electrical system hereinafter particularly described in the specification and shown in the drawing.

BRIEF DESCRIPTION OF THE DRAWING

The single FIGURE drawing is a circuit diagram of a motor vehicle electrical system which includes a light and ignition switching arrangement according to the present invention.

DETAILED DESCRIPTION OF THE PREFERRED EMBODIMENT

Referring to the drawing in more detail, there is shown a circuit diagram of a motor vehicle or automobile electrical system generally designated by the numeral 10.

The electrical system 10 embodies a light and ignition switching arrangement according to the present invention and includes a battery 11, an ignition switch 12, an ignition circuit 13, a starter solenoid 14, a light switch mechanism 15, parking lights 16 and head and tail lights 17.

The light switch mechanism 15 is mounted in a conventional manner on the dashboard 20 of an automobile. The switch 15 has a movable body portion 21 to one end of which is secured a shaft 22 which extends through an opening 23 in the dashboard 20. The shaft 22 is preferably affixed to the body 21 in alignment with the longitudinal axis of the switch body portion 21. A knob 24 is secured to the end of the shaft 22 remote from the switch body 21.

Mounted on the end of the body portion 21 remote from the shaft 22 is a magnetic portion or member 25. The magnetic member 25 preferably is affixed to the switch body 21 with the longitudinal axes of the body 21 and magnetic member 25 in alignment. The magnetic member 25 has a predetermined length and is dimensioned to fit within a solenoid or coil 33. The solenoid 33 when energized operates to pull the magnetic member 25 therein, as shown in the drawing, with the magnetic member 25 centered in the solenoid 33. The axis of the solenoid 33 is aligned with the longitudinal axis of the movable body portion 21 and the body portion 21 is mounted to be movable along a predetermined path of travel which coincides with its longitudinal axis. As hereinafter explained, the coil 33 with the magnetic member 25 defines solenoid means for setting the light switch 15 to its OFF position.

The light switch 15 is a three position switch having an OFF position, a first ON position for turning on the parking lights 16 and a second ON position for illuminating the automobile head and tail lights 17. The switch 15 is shown positioned in its OFF position in the drawing. The switch body 21 carries contacts 26 and 27. A power contact or bus bar 28 is fixedly mounted adjacent the switch body 21 preferably substantially parallel to the longitudinal axis of the body 21. The contact 27 carried by the switch body 21 makes sliding contact with the bus 28 and the contact 27 and bus 28 are appropriately positioned longitudinally with respect to each other to make electrical contact in each of the three positions of the switch 15, i.e. the OFF position, the parking light ON position and the head/tail light ON position.

Fixedly mounted adjacent the switch body 21 is a parking light contact 29 and a head/tail light contact 30. The contacts 29 and 30 are spaced apart along a line substantially parallel to the axis of the switch body 21 and are in alignment with the path of travel of the contact 26 carried by the switch body 21. The contact 26 on the body 21 is electrically connected either through the switch body 21 or in another conventional manner to the contact 27. The contact 26 is dimensioned and shaped to make sliding contact with the contacts 29 and 30 whenever moved adjacent thereto.

As shown in the drawing, the contact 30 is positioned to the left of the contact 29 closer to the dashboard 20. With the switch 15 in the OFF position, the contact 26 carried by the body 21 is positioned to the right of the fixed contact 29 out of electrical contact therewith. The longitudinal positions of the contacts 29 and 30 relative to the contact 26 define, respectively, the parking light ON and the head/tail light ON positions of the light switch mechanism 15. The switch 15 is put in its parking light ON position by manually pulling the knob 24 to the left to move the contact 26 into electrical contact with the fixed contact 29. By pulling the knob 24 to extend the shaft 22 further from the dashboard 20, the switch 15 may be manually positioned in its head/tail light ON position by moving the contact 26 into electrical contact with the contact 30.

It is noted that the switch body portion 21 carrying the contacts 26 and 27 is movably mounted in a conventional manner in the switch housing represented by the dashed lines 31 for reciprocal movement between its OFF and ON positions.

The vehicle parking lights 16 and head and tail lights 17 may each be of any suitable type. For purposes of simplification, the lights 16 and 17 which would generally include more than one lamp are each represented in the drawing by a single lamp. The lights 16 and 17 are electrically connected between ground and the fixed contacts 29 and 30, respectively.

The ignition switch 12 is preferably a rotary switch, such as the type that may be operated by an automobile ignition key. The ignition switch 12 has four switch positions and two movable contacts 40 and 41 ganged together for coordinate rotary motion from one switch position to another. Four fixed contacts 42–45 are associated with the movable contact 40 to define a first switch section and five fixed contacts 46–50 are associated with the movable contact 41 to define a second switch section.

The first ignition switch position is defined by the fixed contacts 42 and 46. The second, third and fourth ignition switch positions are defined, respectively, by the fixed contacts 43 and 47; 44 and 48; and 45, 49 and 50. It is noted that all the fixed electrical contacts 42–50 are physically spaced apart and mounted in an insulative material to be electrically isolated from one another.

The ignition switch 12 has its movable contacts 40 and 41 commonly connected to the positive terminal of the battery 11. The negative terminal of the battery 11 is connected to ground. The fixed ignition switch contacts 42, 45, 46 and 47 are dummy contacts. The ignition switch contacts 43 and 44 are commonly connected to the power terminal 28 of the light switch 15. The automobile ignition circuit 13 which may be of any suitable type is connected between ground and the electrically common ignition switch contacts 48 and 49. The starter solenoid 14 and the solenoid 33 are each connected between the fixed ignition switch or start contact 50 and ground. The starter solenoid 14 controls the operations of the starter motor of the automobile. When the solenoid 14 is energized the starter motor (not shown) is driven to start the automobile.

The operation of the exemplary circuit 10 is now explained. In the first ignition switch position, the movable contacts 40 and 41 contact, respectively, the dummy contacts 42 and 46. This switch position may be termed the ignition LOCK of fully off position since no power from the battery is supplied to the light switch 15, the starter solenoid 14 of the ignition circuit 13.

In the second ignition switch position, the movable contacts 40 and 41 contact, respectively, contact 43 which is connected to the light switch 15 and the dummy contact 47. This switch position may be called a PARK position since power is supplied only to the light switch 15. The knob 24 of the light switch 15 may thus be pulled to illuminate the parking lights 16 or the head and tail lights 17. The parking lights 17 are illuminated when the contact 26 is positioned to make electrical contact with the park contact 29 since an electrical circuit is established from the positive terminal of the battery 11 through the ignition switch contacts 40 and 43, the light switch contacts 28, 26 and 29 and the lights 16 to ground. The head and tail lights 17 are illuminated in a similar manner by pulling the knob 24 further outward from the dashboard 20 to move the switch body 21 to position its carried contact 26 in contact with the head/tail light contact 30.

In the third ignition switch position, the movable ignition contacts 40 and 41 make electrical contact with the fixed contacts 44 and 48, respectively. The contact 44 is commonly connected to the power terminal 28 of the light switch 15 so that the parking lights 16 or head and tail lights 17 may be selectively illuminated by manually positioning the light switch 15 as above-described in connection with the second ignition switch position. The fixed ignition switch contact 48 is connected to the ignition circuit 13 so that in this third ignition switch position power from the battery 11 is supplied through contacts 41 and 48 to the ignition circuit 13. Thus, the automobile once started will continue to run since its ignition circuit 13 is supplied with power. For this reason the third ignition switch position may be called the vehicle RUN position.

In the fourth ignition switch position, the movable contact 40 makes electrical contact with the dummy contact 45 while the ganged movable contact 41 contacts both the fixed ignition contacts 49 and 50. The contact 49 is electrically connected to the ignition circuit 13 so that power is supplied from the battery 11 thereto. The fixed ignition contact 50 is connected to the starter solenoid 14 and the solenoid 33. Power from the battery 11 is thus simultaneously supplied through the contacts 41 and 50 to the starter solenoid 14 to start the automobile engine and to the solenoid 33 to energize it. Energization of the solenoid 33 pulls the magnetic member 25 therein and centers it as shown in the drawing. Thereby, the switch 15 is automatically retracted or set to its OFF position whenever the vehicle engine is started.

It is noted that a spring mechanism or other equivalent arrangement which is not shown is generally associated with the ignition switch 12 to automatically reposition the switch 12 from its START position, i.e. fourth switch position, back to its RUN position, i.e. third switch position, whenever the pressure forcing the switch 12 to its START position is released. It is also noted that in the ignition START position no power from the battery 11 is supplied to the light switch 15 so that the lights 16 and 17 cannot be illuminated at the time the automobile engine is being started.

Thus, there is provided an improved vehicle light-ignition switching arrangement for automobiles and the like which is operable to automatically position a vehicle light switch in its off position when the vehicle is started and is also operable to electrically disconnect the light switch from the vehicle's battery whenever the ignition switch is switched to its start position.

Although the invention has been herein shown and described in what is conceived to be the most practical and preferred embodiment, it is recognized that departures may be made therefrom within the scope of the invention.

I claim:

1. In the electrical system of a motor vehicle wherein a light switch with a movable body portion is positionable along a predetermined path of travel between an off position and at least one on switch position and wherein an ignition switch has a start contact to which electrical power is supplied whenever the ignition switch is positioned in its start position, the improvement in combination therewith of solenoid means electrically connected to said start contact and associated with said light switch for setting said light switch in its off position whenever said solenoid means is energized whereby whenever said ignition switch is positioned in its start position said solenoid means is energized and said light switch set to its off position, said solenoid means comprising a coil element and a magnetic member element, one of said elements being secured to the movable body portion of said light switch, said coil element and said magnetic member element being positioned relative to each other with said magnetic member element extending into said coil element so that energization of said coil element centers said magnetic member element therein to set said light switch to its off position.

2. An electrical system for a motor vehicle, comprising:
   a light switch including a power contact for receiving electrical power, at least one fixed contact defining a switch on position and a movable body portion selectively positionable along a predetermined path of travel between a switch off position and the switch on position defined by said fixed light switch contact, said switch body portion carrying contact means positioned for electrically interconnecting said power contact and said light switch fixed contact whenever said switch body portion is positioned in said light switch on position;
   vehicle lights electrically connected to said fixed light switch contact for receiving electrical power therefrom;
   an ignition switch including first and second switch sections, said first switch section having four fixed contacts defining, respectively, first, second, third and fourth ignition switch positions and a movable contact selectively positionable to make electrical contact with the associated fixed contacts defining each of said ignition switch positions, said second switch section having three fixed contacts defining, respectively, first, second and third ignition switch positions, two fixed contacts defining a fourth ignition switch position and a movable contact selectively positionable for making electrical contact with the associated fixed contacts defining each of said ignition switch positions, said movable contacts of said first and second switch sections being ganged for coordinate movement from one of said ignition switch positions to another, the fixed ignition switch contacts defining said first and fourth ignition switch positions in said first switch section and said first and second ignition switch positions in said second switch section being dummy contacts;
   means electrically interconnecting the fixed ignition switch contacts defining said second and third ignition switch positions in said first switch section commonly to said power contact of said light switch;
   a battery for supplying electrical power;
   means electrically interconnecting said movable contacts of said ignition switch commonly to said battery;
   solenoid means associated with said light switch for setting said light switch in its off position whenever said solenoid means is energized, said solenoid means associated with said light switch comprising a coil element and a magnetic member element, one of said elements being secured to the movable body portion of said light switch, said coil element and said magnetic member element being positioned relative to each other with said magnetic member element extending into said coil element so that energization of said coil element centers said magnetic member element therein to set said light switch to its off position;
   motor vehicle ignition circuit means;
   starter solenoid means for a motor vehicle;
   means electrically connecting one of the fixed ignition switch contacts defining said fourth ignition switch position in said second switch section commonly to said starter solenoid means and said solenoid means associated with said light switch; and
   means electrically connecting the other one of the fixed ignition switch contacts defining said fourth ignition switch position in said second switch section and the fixed contact defining said third ignition switch position in said second switch section commonly to said ignition circuit means.

3. In the electrical system of a motor vehicle wherein a light switch with a movable body portion is positionable along a predetermined path of travel between an off position and at least one on switch position and wherein an ignition switch has a start contact to which electrical power is supplied whenever the ignition switch is positioned in its start position, the improvement in combination therewith of solenoid means electrically connected to said start contact and associated with said light switch for setting said light switch in its off position whenever said solenoid means is energized whereby whenever said ignition switch is positioned in its start position said solenoid means is energized and said light switch set to its off position, said solenoid means comprising a coil positioned adjacent the movable body portion of said light switch with the axis of said coil substantially aligned with the predetermined path of travel of the movable body portion of said light switch and a magnetic member secured to the movable body portion of said light switch to extend into said coil whereby energization of said coil centers said magnetic member therein to set said light switch in its off position.

4. In the electrical system of a motor vehicle wherein a light switch with a movable body portion is positionable along a predetermined path of travel between an off position and at least one on switch position and wherein an ignition switch has a start contact to which electrical power is supplied whenever the ignition switch is positioned in its start position, the improvement in combination therewith of solenoid means electrically connected to said start contact and associated with said light switch for setting said light switch in its off position whenever said solenoid means is energized whereby whenever said ignition switch is positioned in its start position said solenoid means is energized and said light switch set to its off position, said light switch having a power contact to which power is supplied through said ignition switch, the start contact of said ignition switch being electrically isolated from said power contact.

5. An electrical system for a motor vehicle, comprising:
a light switch including a power contact for receiving electrical power, at least one fixed contact defining a switch on position and a movable body portion selectively positionable along a predetermined path of travel between a switch off position and the switch on position defined by said fixed light switch contact, said switch body portion carrying contact means positioned for electrically interconnecting said power contact and said light switch fixed contact whenever said switch body portion is positioned in said light switch on position;
vehicle lights electrically connected to said fixed light switch contact for receiving electrical power therefrom;
an ignition switch including first and second switch sections, said first switch section having four fixed contacts defining, respectively, first, second, third and fourth ignition switch positions and a movable contact selectively positionable to make electrical contact with the associated fixed contacts defining each of said ignition switch positions, said second switch section having three fixed contacts defining, respectively, first, second and third ignition switch positions, two fixed contacts defining a fourth ignition switch position and a movable contact selectively positionable for making electrical contact with the associated fixed contacts defining each of said ignition switch positions, said movable contacts of said first and second switch sections being ganged for coordinate movement from one of said ignition switch positions to another, the fixed ignition switch contacts defining said first and fourth ignition switch positions in said first switch section and said first and second ignition switch positions in said second switch section being dummy contacts;
means electrically interconnecting the fixed ignition switch contacts defining said second and third ignition switch positions in said first switch section commonly to said power contact of said light switch;
a battery for supplying electrical power;
means electrically interconnecting said movable contacts of said ignition switch commonly to said battery;
solenoid means associated with said light switch for setting said light switch in its off position whenever said solenoid means is energized, said solenoid means associated with said light switch comprising a coil and a magnetic member, said coil being positioned adjacent the movable body portion of said light switch with the axis of said coil substantially aligned with the predetermined path of travel of the movable body portion of said light switch, said coil being electrically connected commonly with said starter solenoid means, said magnetic member being secured to the movable body portion of said light switch to extend into said coil whereby energization of said coil centers said magnetic member therein to set said light switch in its off position;
motor vehicle ignition circuit means;
starter solenoid means for a motor vehicle;
means electrically connecting one of the fixed ignition switch contacts defining said fourth ignition switch position in said second switch section commonly to said starter solenoid means and said solenoid means associated with said light switch; and
means electrically connecting the other one of the fixed ignition switch contacts defining said fourth ignition switch position in said second switch section and the fixed contact defining said third ignition switch position in said second switch section commonly to said ignition circuit means.

6. The invention defined in claim 3, wherein said light switch has a power contact to which power is supplied through said ignition switch and the start contact of said ignition switch is electrically isolated from said power contact.

* * * * *